US011442144B2

(12) United States Patent
Burke et al.

(10) Patent No.: US 11,442,144 B2
(45) Date of Patent: Sep. 13, 2022

(54) SYSTEM AND METHOD FOR AUTOMATICALLY DETERMINING CROP CHARACTERISTICS USING UNMANNED AERIAL VEHICLE (UAV)

(71) Applicant: Biotique Systems, Inc., Reno, NV (US)

(72) Inventors: John Burke, Reno, NV (US); Michael Rogoff, Reno, NV (US); Stephen Sanders, Reno, NV (US)

(73) Assignee: Biotique Systems, Inc., Reno, NV (US)

( * ) Notice: Subject to any disclaimer, the term of this patent is extended or adjusted under 35 U.S.C. 154(b) by 602 days.

(21) Appl. No.: 16/145,897

(22) Filed: Sep. 28, 2018

(65) Prior Publication Data

US 2019/0170860 A1    Jun. 6, 2019

Related U.S. Application Data

(60) Provisional application No. 62/565,585, filed on Sep. 29, 2017.

(51) Int. Cl.
*G01S 7/48*    (2006.01)
*B64C 39/02*    (2006.01)
(Continued)

(52) U.S. Cl.
CPC .......... *G01S 7/4808* (2013.01); *B64C 39/024* (2013.01); *G01S 15/02* (2013.01);
(Continued)

(58) Field of Classification Search
CPC ........ G01S 7/4808; G01S 5/02; G06F 16/909; B64C 39/024; G05D 1/0646
(Continued)

(56) References Cited

U.S. PATENT DOCUMENTS

| 10,380,694 B1 * | 8/2019 | Grant .................... G08G 1/205 |
| 2016/0050840 A1 * | 2/2016 | Sauder ............... G06K 9/00657 |
| | | 701/3 |

(Continued)

OTHER PUBLICATIONS

Hammerle, Martin and Bernhard Hofle, "Direct derivation of maize plant and crop height from lowcost timeofflight camera measurements", Nov. 28, 2016, pp. 1-13, vol. 12:50, Publisher: Plant Methods, Published in: DOI 10.1186/s13007-016-0150-6.

(Continued)

*Primary Examiner* — Michael P Nghiem
(74) *Attorney, Agent, or Firm* — Wolter Van Dyke Davis, PLLC; Eugene J. Molinelli; Cian O'Brien

(57) ABSTRACT

A method and apparatus for automatically determining a characteristic of a crop using an unmanned aerial vehicle (UAV) includes operating the UAV at an elevation above a ground surface of a field and collecting first data that indicates an elevation of the UAV with a barometric pressure based altimeter of the UAV. Second data is collected with a SONAR sensor of the UAV that indicates a distance to a nearest object on the ground surface. The SONAR sensor has a SONAR sensor range and the elevation above the ground surface is less than the SONAR sensor range. The method further includes receiving the first data and the second data on a processor, and determining a height of the nearest object above the ground surface with the processor based on the first data and second data. Output data that indicates the height of the nearest object is presented on a display.

24 Claims, 12 Drawing Sheets

(51) Int. Cl.
  G01S 15/02   (2006.01)
  G05D 1/06    (2006.01)
  G06F 16/909  (2019.01)
  G01S 15/88   (2006.01)
  G01S 15/04   (2006.01)
  G01S 15/86   (2020.01)
  G06Q 50/02   (2012.01)

(52) U.S. Cl.
  CPC .............. *G01S 15/04* (2013.01); *G01S 15/86* (2020.01); *G01S 15/88* (2013.01); *G05D 1/0646* (2013.01); *G06F 16/909* (2019.01); *B64C 2201/123* (2013.01); *B64C 2201/125* (2013.01); *B64C 2201/141* (2013.01); *G06Q 50/02* (2013.01)

(58) Field of Classification Search
  USPC .......................................................... 702/159
  See application file for complete search history.

(56) References Cited

U.S. PATENT DOCUMENTS

| | | | |
|---|---|---|---|
| 2016/0327956 A1* | 11/2016 | Zhang | B64D 45/00 |
| 2017/0199528 A1* | 7/2017 | Detweiler | A01M 21/00 |
| 2018/0156770 A1* | 6/2018 | Saez | G01N 33/24 |
| 2018/0314268 A1* | 11/2018 | Tan | B64C 39/024 |
| 2020/0244890 A1* | 7/2020 | Peters | A01M 31/002 |

OTHER PUBLICATIONS

Murthy, V. Radha Krishna, "Crop Growth Modeling and Its Applications in Agricultural Meteorology", pp. 235-261, Publisher: Satellite Remote Sensing and GIS Applications in Agricultural Meteorology, Published in: http://www.wamis.org/agm/pubs/agm8/Paper-12.pdf.

Zhang, Lei and Tony Grift, "A LIDAR-based crop height measurement system for Miscanthus giganteus", Apr. 2, 2012, pp. 70-77, vol. 85, Publisher: Computers and Electronics in Agriculture, Published in: http://dx.doi.org/10.1016/j.compag.2012.04.001.

* cited by examiner

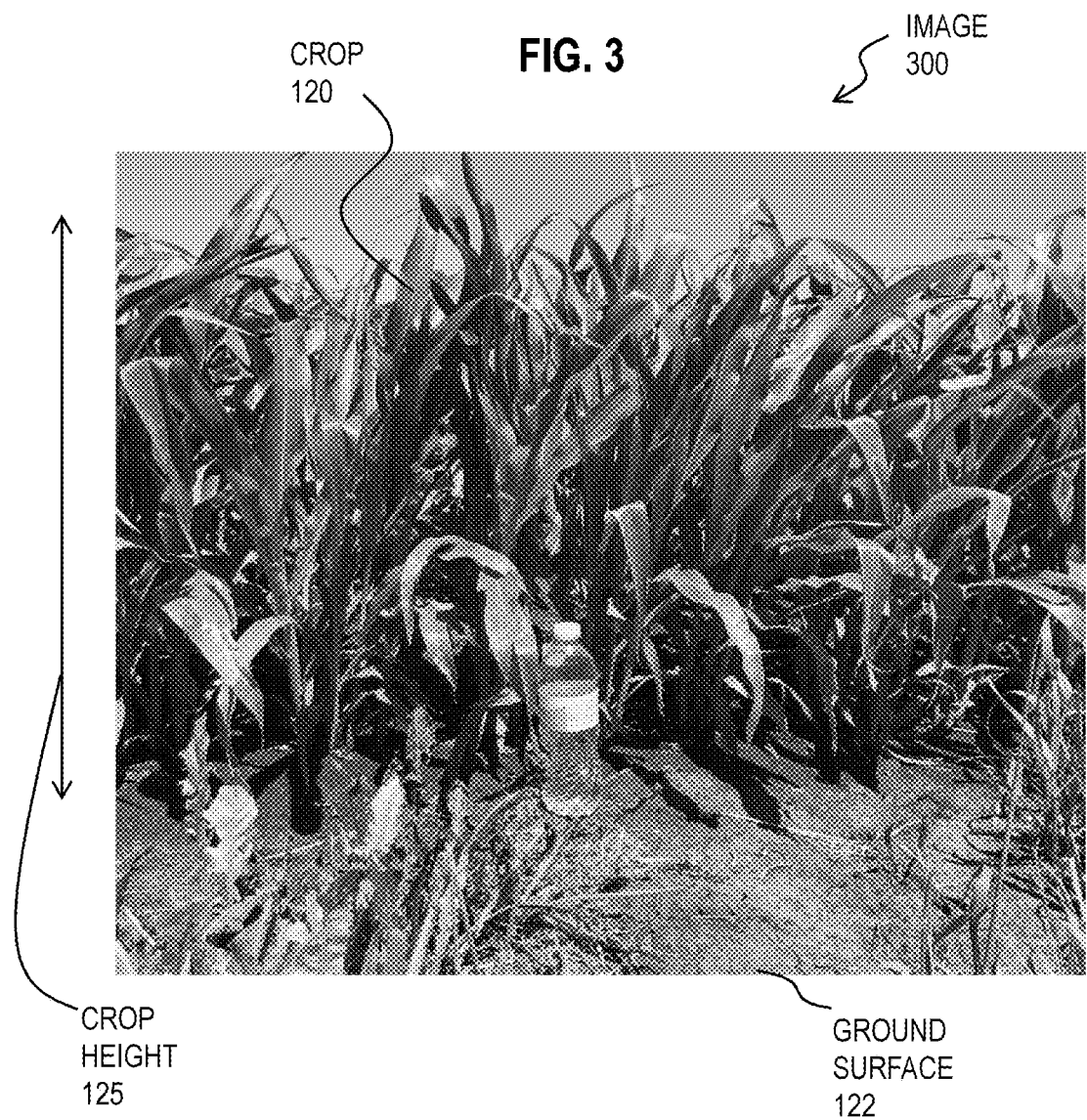

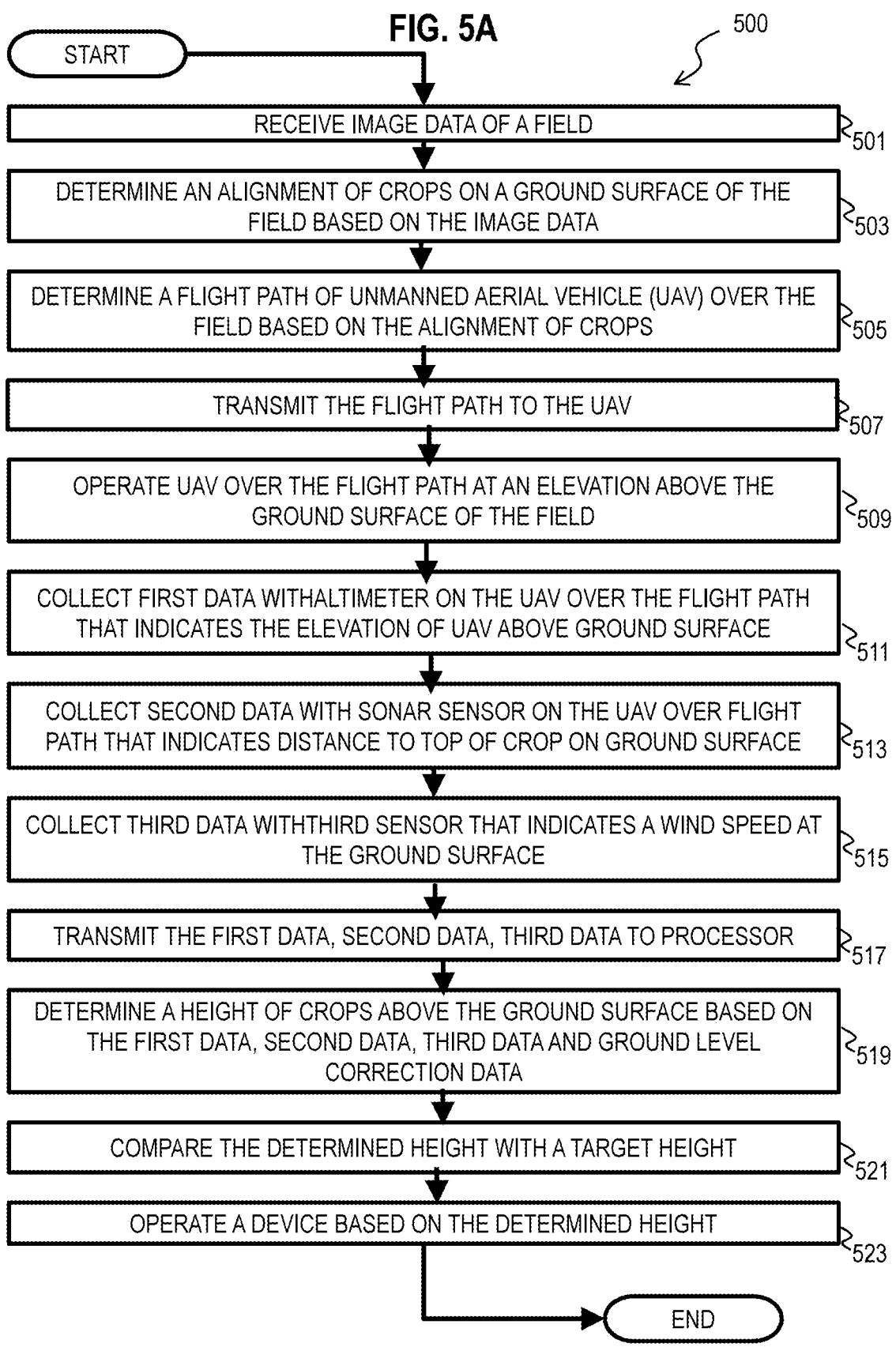

SYSTEM AND METHOD FOR AUTOMATICALLY DETERMINING CROP CHARACTERISTICS USING UNMANNED AERIAL VEHICLE (UAV)

CROSS-REFERENCE TO RELATED APPLICATION

This application claims benefit of Provisional Appln. 62/565,585, filed Sep. 29, 2017 the entire contents of which are hereby incorporated by reference as if fully set forth herein, under 35 U.S.C. § 119(e).

BACKGROUND

Automatically measuring the height, stage of growth and other characteristics of crops is an important task in agriculture. Such measured characteristics are used to indicate useful information, such as when it is time to harvest the crops, or change irrigation procedures, or estimate yield.

SUMMARY

Techniques are provided for automatically measuring characteristics of a crop growing in a field. The current inventors have recognized that conventional techniques for automatically measuring such characteristics have notable drawbacks. In one example, unmanned aerial vehicles (UAV) with image analysis construct three-dimensional models of the field which are then used to estimate crop height. However, these models require extensive image data and have noticeable error. In another example, UAVs are provided with LIDAR (Light Detection and Ranging) systems to measure crop height, however these LIDAR systems are expensive and bulky, thereby requiring larger and more expensive UAVs. A system and method is provided that addresses the drawbacks of conventional techniques for automatically measuring crop characteristics. The current inventors recognized that the standard equipment on low cost UAVs is capable of making useful measurements.

In a first set of embodiments, a method is provided for automatically determining a height of an object above a ground surface of a field. The method includes operating an unmanned aerial vehicle (UAV) at an elevation above the ground surface of the field. The method further includes collecting first data that indicates an elevation of the UAV with a barometric pressure based altimeter of the UAV. The method further includes collecting second data with a Sound Navigation and Ranging (SONAR) sensor of the UAV that indicates a distance to a nearest object on the ground surface. The SONAR sensor has a SONAR sensor range and the elevation above the ground surface is less than the SONAR sensor range. The method further includes receiving the first data and the second data on a processor. The method further includes determining a height of the nearest object above the ground surface with the processor based on the first data and second data. The method further includes presenting on a display device output data that indicates the height of the nearest object.

In a second set of embodiments, a system is provided for automatically determining a height of an object above a ground surface of a field. The system includes a UAV including the barometric pressure based altimeter to measure first data that indicates an elevation of the UAV above a ground surface and the SONAR sensor to measure second data that indicates a distance to a nearest object on the ground surface. The SONAR sensor has a SONAR sensor range and the elevation above the ground surface is less than the SONAR sensor range. The system also includes a processor and a memory including one or more sequences of instructions, where the memory and one or more sequences of instructions cause the system to receive the first data and the second data from the UAV, determine a height of the nearest object above the ground surface based on the first data and the second data and present output data on a display device that indicates the height of the nearest object.

In a third set of embodiments, a computer-readable medium is provided carrying one or more sequences of instructions, where execution of the sequences of instructions on a processor causes the processor to perform one or more steps of the above described method.

In a fourth set of embodiments, an apparatus is provided for automatically determining a height of an object above a ground surface of a field. The apparatus includes a processor, a memory including one or more sequences of instructions where the memory and the sequences of instructions are configured to cause the apparatus to perform one or more steps of the above described method.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 3 is an image that that illustrates an example of the crop in the field of FIG. 1B, according to an embodiment;

FIG. 5A is a flow chart that illustrates an example method for automatically determining a characteristic of a crop in a field or other properties of other objects on the ground surface, according to an embodiment;

DETAILED DESCRIPTION

A method and system are described for automatically determining one or more characteristics of a crop in a field or other properties of other objects on the ground surface of the field. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of automatically determining a characteristic of a crop in a field. However, the invention is not limited to this context. In other embodiments, other properties of other objects on the ground are determined. For example, assessing flood stages, detecting an appearance of invasive vegetation and measuring a height of livestock.

1. Overview

Figure 1A:
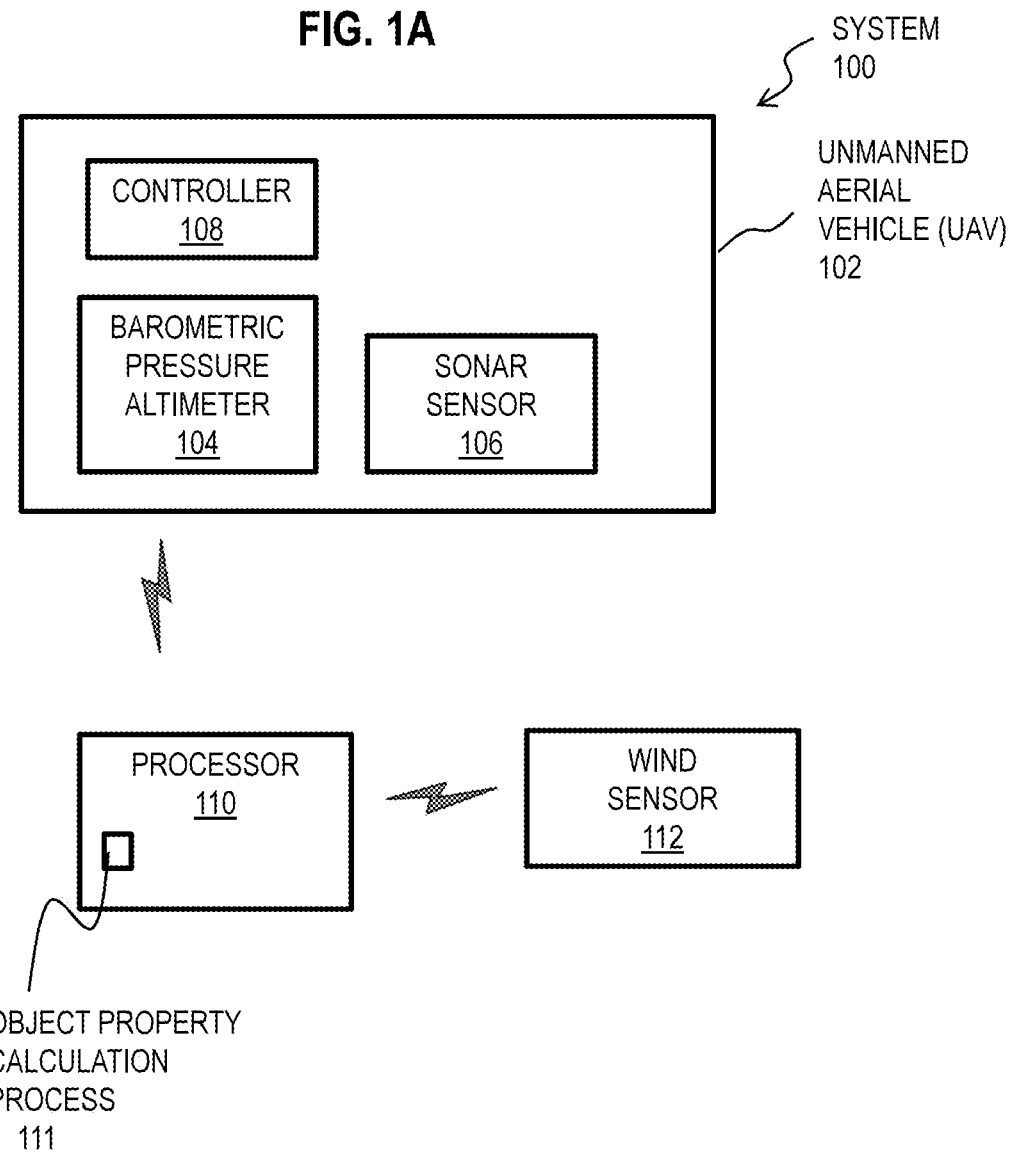
FIG. 1A is a block diagram that illustrates example components of a system for automatically determining a characteristic of a crop in a field or other properties of other objects on the ground surface, according to an embodiment.
Figure 1B:
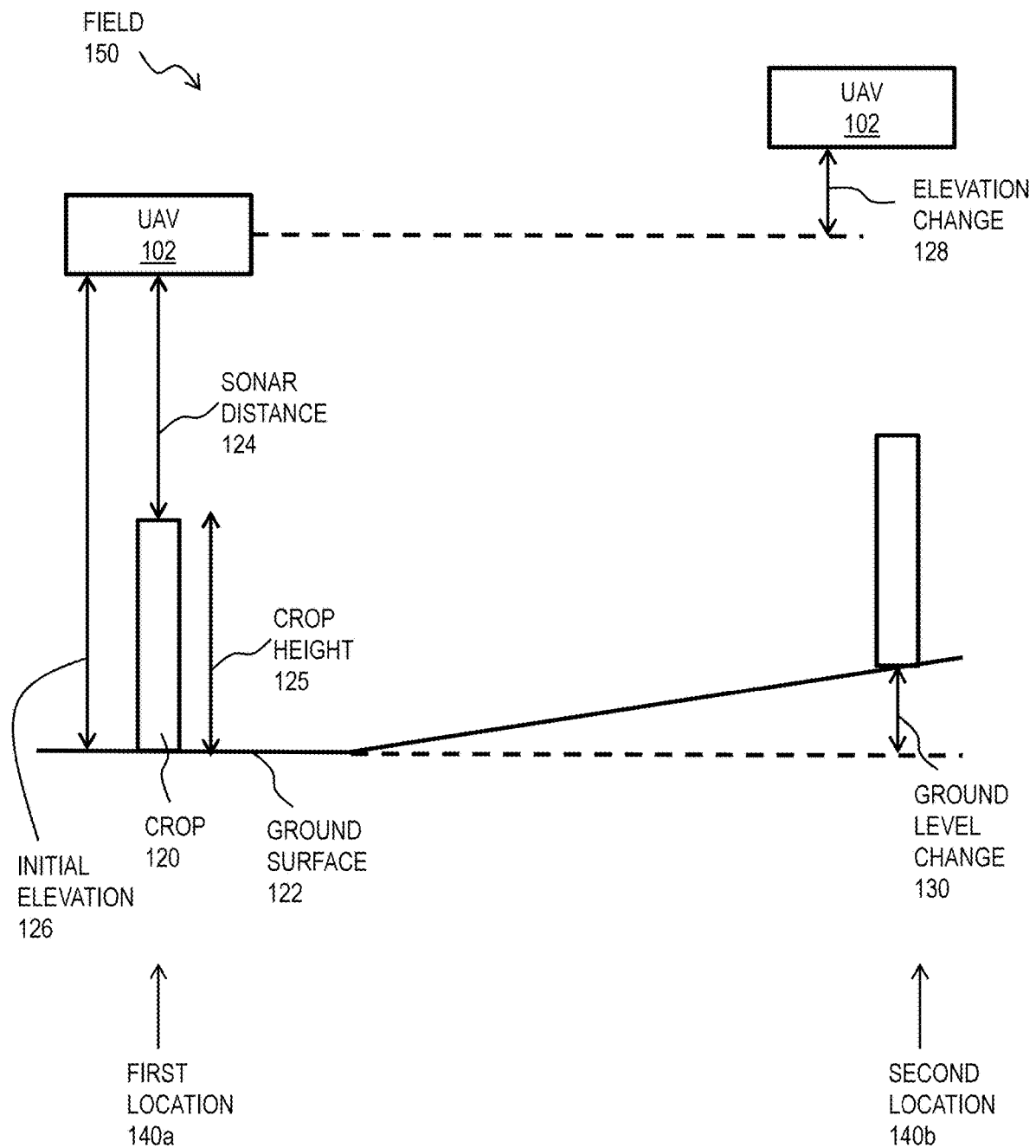
FIG. 1B is a block diagram that illustrates an example operation of the UAV of the system of FIG. 1A flying at an elevation over the field, according to an embodiment.

FIG. 1A is a block diagram that illustrates example components of a system 100 for automatically determining a characteristic of a crop in a field or other properties of other objects on the ground, according to an embodiment. FIG. 1B is a block diagram that illustrates an example operation of an unmanned aerial vehicle (UAV) 102 of the system 100 of FIG. 1A flying at an elevation 126 over the field 150, according to an embodiment. The UAV 102 includes a first sensor to measure data that indicates the elevation 126 of the UAV 102 above a ground surface 122 of the field 150. In some embodiments, the first sensor is a barometric pressure based altimeter 104 that measures a barometric pressure that is used to determine a change 128 in the elevation 126. In other embodiments, the first sensor is a global positioning system (GPS) sensor.

In an embodiment, the UAV 102 commences flying over the field 150 at a first location 140a, where the UAV 102 has an initial elevation 126 over the ground surface 122. In an example embodiment, the system 100 is calibrated so that the initial elevation 126 is predetermined or known. Subsequent measurements of the altimeter 104 at a second location 140b indicate a change 128 in the elevation of the UAV 102 relative to the initial elevation 126 at the first location 140a. Thus, the elevation of the UAV 102 at the second location 140b is determined by the initial elevation 126 and the measurement of the altimeter 104 at the second location 140b. In an example embodiment, the altimeter 104 measures the elevation of the UAV 102 at each location 140a, 140b as the UAV 102 flies over each respective location 140a, 140b of the ground surface 122.

In an embodiment, the UAV 102 also includes a Sound Navigation and Ranging (SONAR) sensor 106 to measure data that indicates a distance 124 to a nearest object (e.g. a top of an object 120, such as a crop) on the ground surface 122. In an example embodiment, the SONAR sensor 106 measures the distance 124 at each location 140a, 140b as the UAV 102 flies over each respective location 140a, 140b of the ground surface 122. In many embodiments, to conserve power, the SONAR sensor only makes measurements when the UAV elevation is within a certain distance (range) of the initial elevation.

In an embodiment, the system 100 also includes a wind sensor 112 that measures data that indicates a wind speed at the ground surface 122. In some embodiments, multiple wind sensors 112 are positioned at each location 140a, 140b to measure the respective wind speed at each location 140a, 140b along the ground surface 122. In an embodiment, a single wind sensor 112 is employed. In some embodiments, the wind sensor 112 is positioned on the ground surface 122. In other embodiments, the wind sensor 112 is positioned on the UAV 102.

In an embodiment, the system 100 also includes a processor 110 that receives the data from the altimeter 104 and the data from the SONAR sensor 106. In some embodiments, the processor 110 is positioned at a ground station and is in wireless communication with the UAV 102. In an example embodiment, a controller 108 on the UAV 102 receives the data from the altimeter 104 and SONAR sensor 106 and the controller 108 wirelessly transmits the data to the processor 110 at the ground station. In another embodiment, the processor 110 is located on the UAV 102 and receives the data from the barometric pressure based altimeter 104 and SONAR sensor 106 on the UAV 102.

Figure 6:
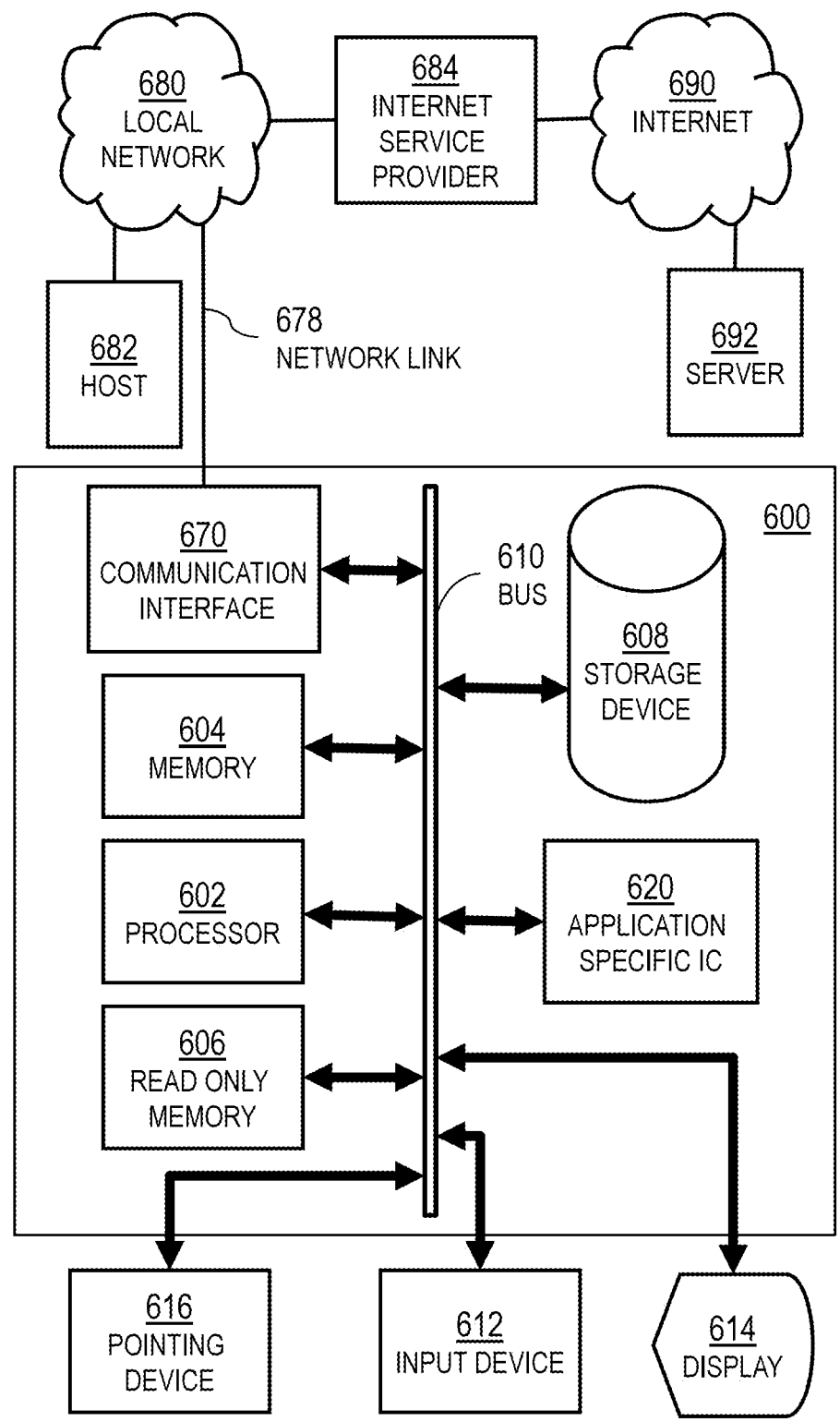
FIG. 6 is a block diagram that illustrates a computer system upon which an embodiment of the invention may be implemented.
Figure 7:
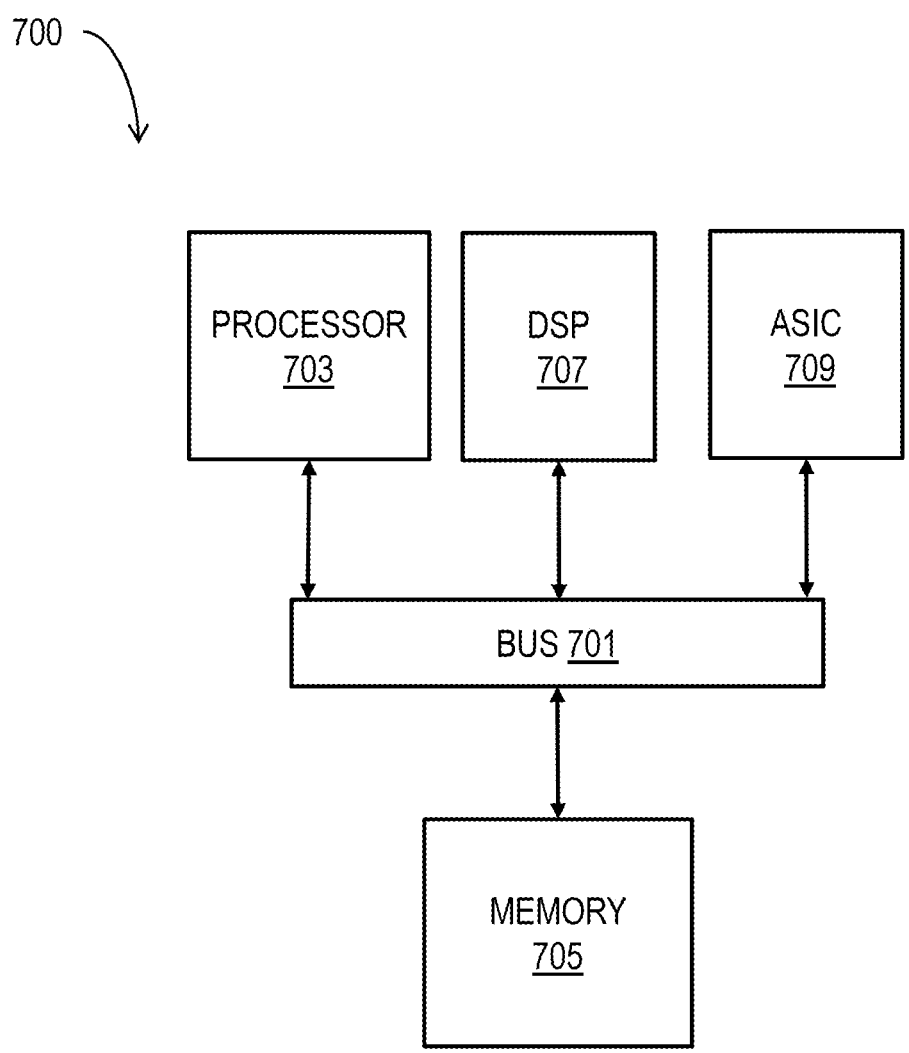
FIG. 7 illustrates a chip set upon which an embodiment of the invention may be implemented.
Figure 8:
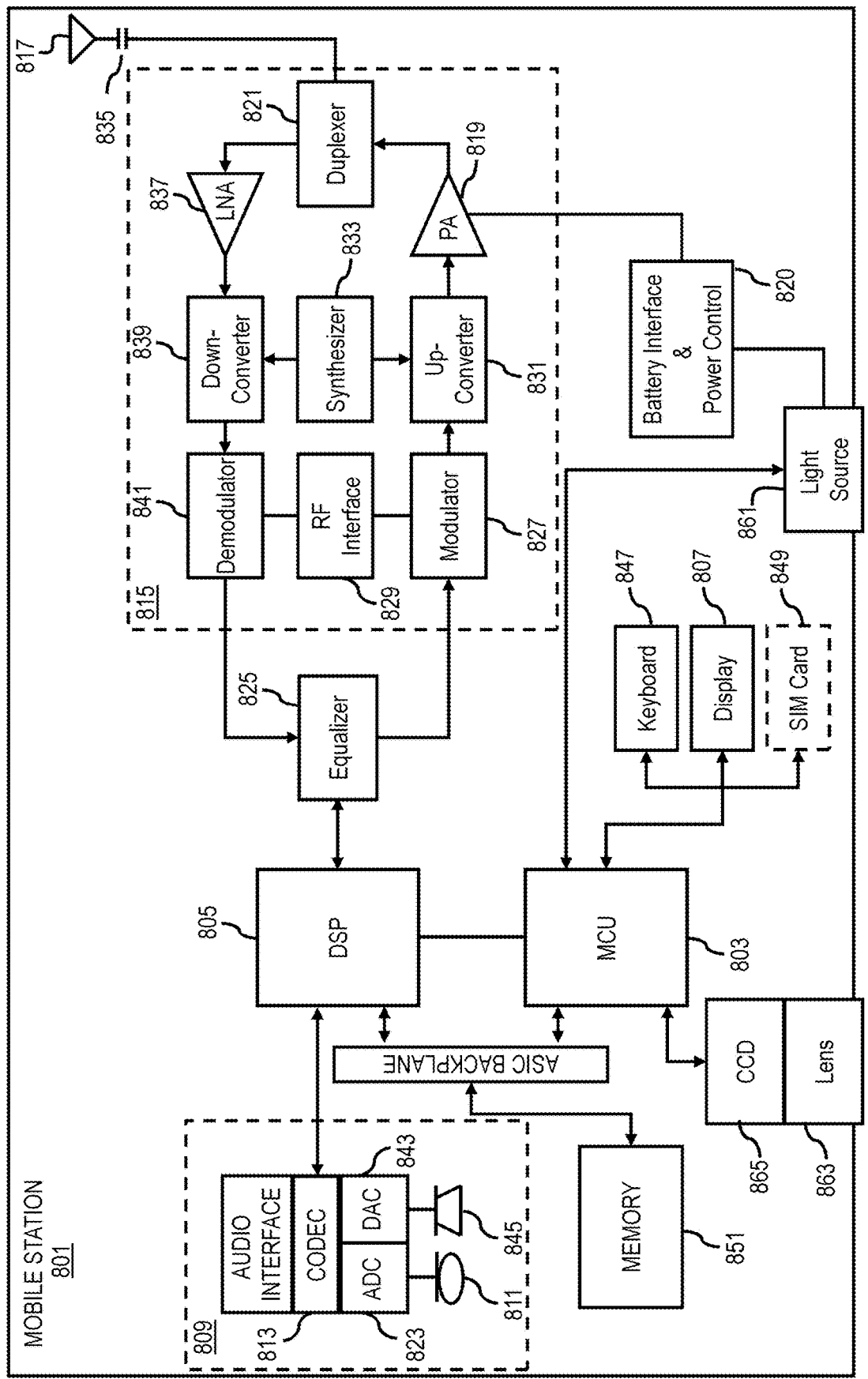
FIG. 8 illustrates a mobile terminal upon which an embodiment of the invention may be implemented.

The processor 110 includes an object property calculation module 111 to perform one or more steps of a method described below with reference to FIG. 5A. In various embodiments, the processor 110 comprises one or more general purpose computer systems, as depicted in FIG. 6 or one or more chip sets as depicted in FIG. 7 or one or more mobile terminals as depicted in FIG. 8, and instructions to cause the computer or chip set or mobile terminal to perform one or more steps of a method described below with reference to FIG. 5A.

In an embodiment, the processor 110 determines a property (e.g., a growth stage) of the object 120 (such as a crop) at each location 140a, 140b in the field 150, based on the data from the altimeter 104 and data from the SONAR sensor 106 measured at each location 140*a*, 140*b*. In one embodiment, the processor 110 determines a height 125 of the object 120 at each location 140*a*, 140*b* based on the data. In this embodiment, the processor calculates the height 125 based on:

$$H=E-D \qquad (1)$$

where H is the height 125 of the object, E is the elevation at each location 140*a*, 140*b* that is determined from the altimeter 104 data and D is the distance 124 at each location 140*a*, 140*b* that is determined from the SONAR sensor 106 data.

The altimeter 104 data indicates changes 128 to the elevation 126 of the UAV 102, and the altimeter 104 data is insensitive to a change 130 in an elevation of the ground surface 122 between the locations 140*a*, 140*b*. However, such a change 130 in the elevation of the ground surface 122 would affect the height 125 calculated by equation 1. Thus, to account for scenarios where the ground surface 122 experiences changes in elevation, the processor 110 receives ground level correction data for each location 140*b* over the field 150. In one embodiment, the ground level correction data indicates the ground level change 130 at each location 140*b* over the field 150 (e.g. difference between the elevation of the ground surface 122 at the location 140*b* relative to the elevation of the ground surface at the location 140*a*). In some embodiments, the ground level correction data is topographic height data stored on a geospatial database. In an example embodiment, the geospatial database is located at a remote server (e.g. server 692) that is accessed by the processor 110 (e.g. through network link 678). In other embodiments, the ground level correction data is survey data obtained by performing a survey of the field 150 prior to placement of the object 120 (e.g., before planting or emergence of crops). In an example embodiment, the survey data is stored in a memory (e.g. memory 604) of the processor 110.

In one embodiment, the processor 110 determines the height 125 of the object 120 at each location 140*a*, 140*b* based on the data from the altimeter 104, the SONAR sensor 106 and the ground level correction data. In this embodiment, the processor calculates the height 125 based on:

$$H=(E-D)-GLC \qquad (2)$$

where H is the height 125 of the object (e.g., crop), E is the elevation at each location 140*a*, 140*b*, D is the distance 124 at each location 140*a*, 140*b* and GLC is the ground level correction data at each location 140*b*. In an example embodiment, as the UAV 102 moves from the location 140*a* to the location 140*b*, E in equation 2 increases by the elevation change 128 and GLC in equation 2 also changes (e.g. from zero at location 140*a* to non-zero value at location 140*b*).

In an embodiment, the processor 110 receives the data from the wind sensor 112. In another embodiment, the processor 110 determines the height 125 of the object 120 (e.g. crop) at each location 140*a*, 140*b* based on the data from the altimeter 104, the SONAR sensor 106, the ground level correction data and the data from the wind sensor 112. In this embodiment, the processor calculates the height 125 based on Equation 3.

$$H=(E-D)-GLC+f(w) \qquad (3)$$

where H is the height 125 of the object (e.g., crop), E is the elevation at each location 140*a*, 140*b*, D is the distance 124 at each location 140*a*, 140*b*, GLC is the ground level correction data at each location 140*b* and $f$ is a function and w is the wind speed indicated by the data from the wind sensor 112. In this embodiment, equation 3 is used to account for the wind bending the object (e.g., stalks of the crop) and thus calculates the actual height 125 unaffected by the wind. In one embodiment, the function f is determined using a default setting from empirical observation of about 1 inch reduction in object height per knot of wind speed. In some embodiments, the default setting from empirical observations is in a range from about 0.5 inches to about 3 inches in reduction in object height per knot of wind speed. In some embodiments, the function $f$ is selected based on the type of object 120 (e.g. type of crop), as different types of objects 120 are bent different degrees by the same wind speed. In other embodiments, the function $f$ is estimated based on one or more characteristics of the object 120 including the type of the object 120, a growth stage of the object 120 (e.g. growth stage of the crop), a time since planting the object 120 (e.g. crop) and the height of the object 120.

In an embodiment, the altimeter 104 and SONAR sensor 106 measure data at regular time increments as the UAV 102 travels over the field 150 and the processor 110 receives this time increment data. The processor 110 determines the object height 125 at the spaced apart locations 140*a*, 140*b* based on the time increment data (e.g. the object height 125 at location 140*a* is determined based on data measured at a first time increment and the object height 125 at location 140*b* is determined based on data measured at a second time increment). In one embodiment, the processor 110 calculates the object height 125 at a location 140*b* as an average of the determined object height 125 (e.g. using one of equations 1, 2, or 3) at a plurality of successive time increments during a time the UAV is at or above the location 140*a* or 140*b*. In other embodiments, the plurality of proximal locations are defined based on a maximum threshold of time increments that data is measured from the altimeter 104 and SONAR sensor 106. In an example embodiment, the time increment is about 0.01 seconds. In some embodiments, the time increment is selected within a range from about 0.001 seconds to about 0.1 seconds.

2. Example Embodiments

Figure 2A:
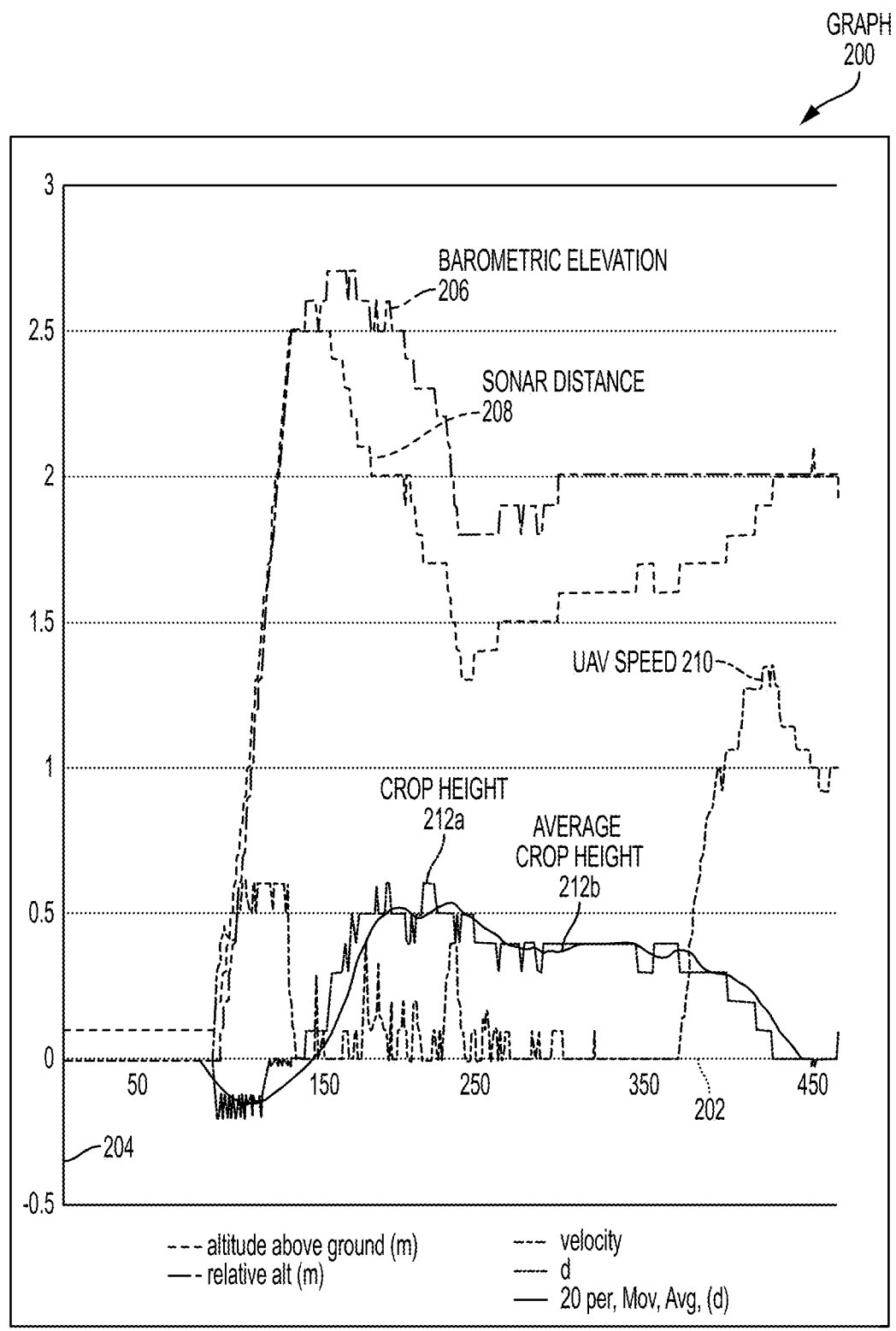
FIG. 2A is a graph that illustrates an example of barometric elevation and SONAR distance measured by the UAV of the system of FIG. 1A over a flight path over the field, according to an embodiment.

FIG. 2A is a graph 200 that illustrates an example of a barometric elevation 206 curve and a SONAR distance 208 curve measured by an experimental UAV 102 of the system 100 of FIG. 1A over a flight path over a particular field 150, according to an embodiment. The horizontal axis 202 is time in units of seconds (sec). The vertical axis 204 is distance in units of meters (m). The barometric elevation 206 curve represents the data measured from the altimeter 104 at a plurality of time increments as the UAV 102 travels over the flight path. The barometric elevation 206 curve indicates the change 128 in the elevation relative to the initial elevation 126. The SONAR distance 208 curve represents the data measured from the SONAR sensor 106 at a plurality of time increments as the UAV 102 travels over the flight path.

The graph 200 also illustrates an example of a crop height 212*a* curve (e.g. calculated using one of equations 1, 2, or 3) based on a difference between the barometric elevation 206 and SONAR distance 208. The crop height curve 212*a* represents the determined height 125 at the plurality of time increments as the UAV 102 travels over the flight path. The graph 200 also illustrates an example of an average crop height 212*b* curve at each time increment along the flight path. In an embodiment, a value of the average crop height 212*b* curve at a time increment is determined based on an average of the crop height 212*a* curve at a number of proximal time increments (e.g. 20). In an example embodiment, the graph 200 shows that the average crop height 212*b* varies between 0.4 m and 0.5 m. In an example embodiment, this average crop height 212 range corresponds to a growth range of corn between V7 and V10. As appreciated by one of ordinary skill in the art, the V scale is a vegetative growth stage. Once planted, corn seeds absorb water from the soil and begin to grow. An initial growth stage VE (emergence) occurs when the coleoptile (spike) pushes through the soil surface. The seminal roots do much of the early work, but growth slows after VE as nodal roots begin to grow. The young plant has developed to the point that the collar is showing on the first leaf. This leaf is usually more rounded at the tip than succeeding leaves. From here each vegetative stage is determined by counting the visible collars in the sequence V1, V2, V3 . . . VN until the Tassel emerges at VT and maximum height is attained. The graph 200 also illustrates an example of a speed 210 curve of the UAV 102 along the flight path. The values of the crop height 212a, 212b curves are advantageously robust to variations in the speed 210 of the UAV 102 along the flight path.

Figure 2B:
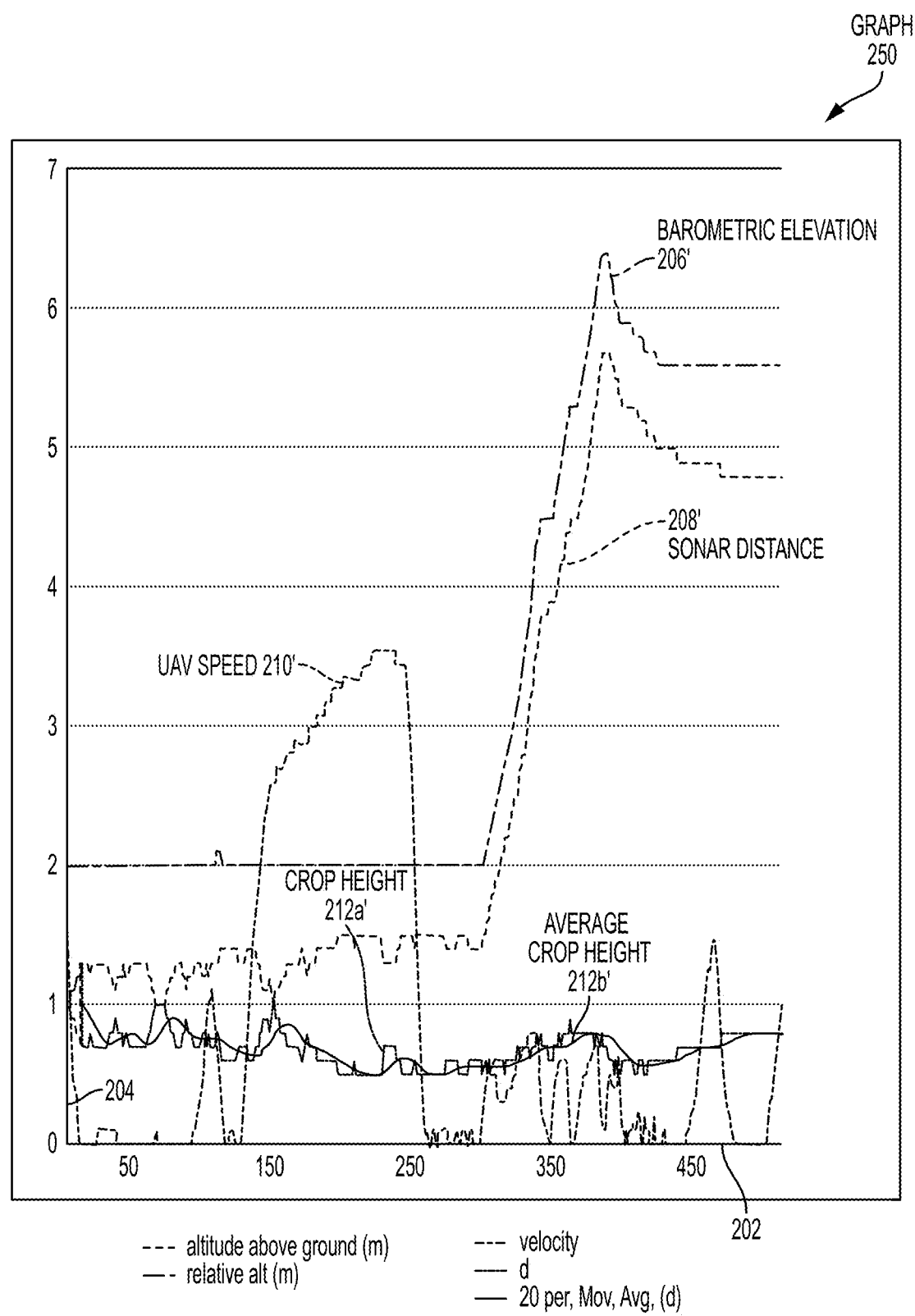
FIG. 2B is a graph that illustrates an example of barometric elevation and SONAR distance measured by the UAV of the system of FIG. 1A over a flight path over the field, according to an embodiment.

FIG. 2B is a graph 250 that illustrates an example of a barometric elevation 206' curve and a SONAR distance 208' curve measured by an experimental UAV 102 of the system 100 of FIG. 1A over the flight path over a particular field 150, according to an embodiment. The horizontal axis 202 is time in units of seconds (sec). The vertical axis 204 is distance in units of meters (m). In an example embodiment, the graph 200 shows that the average crop height 212b' varies between 0.5 m and 0.9 m. The values of the crop height 212a', 212b' curves are advantageously robust to variations in the barometric elevation 206' curve based on elevation changes 128 of the UAV 102 along the flight path.

FIG. 3 is an image 300 that illustrates an example of the crop 120 in the field 150 of FIG. 1B, according to an embodiment. The height 125 of the crop 120 above the ground surface 122 is depicted in FIG. 1B. In an example embodiment, the crop 120 is corn.

Figure 4A:
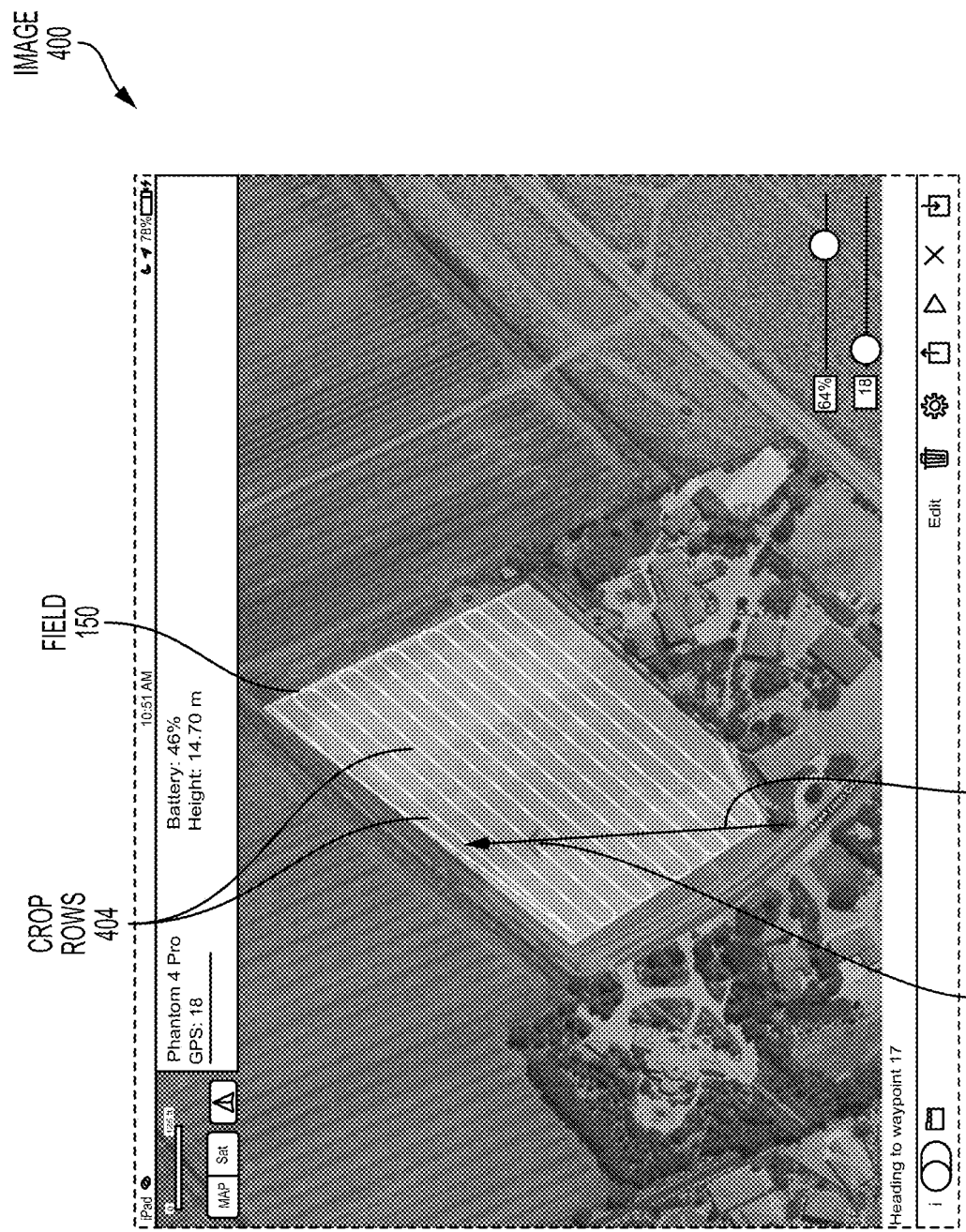
FIG. 4A is an image that illustrates an example of crop rows in a field and a flight path of a UAV over the field based on the crops rows, according to an embodiment.

FIG. 4A is an image 400 that illustrates an example of crop rows 404 in the field 150 and a flight path 406 of the UAV 102 over the field 150 based on the crops rows 404, according to an embodiment. In an embodiment, the image 400 is image data of the field 150 that is captured at an altitude above the field 150. In an example embodiment, the image 400 is captured by an aircraft flying over the field 150. In some embodiments, the image 400 is uploaded to the processor 110 over a network (e.g. network link 678). In other embodiments, the image 400 is uploaded to the processor 110 using an input device 612 (e.g. camera connected to the processor 110).

In some embodiments, the processor 110 determines data regarding the crops 120 in the field 150 based on the image 400. In one embodiment, the processor 110 determines an alignment of the crops 120 in the field (e.g. crop rows 404). In this embodiment, the processor 110 uses image analysis to determine the alignment of the crops 120, based on the image 400. The processor 110 then determines the flight path 406 of the UAV 102 over the field 150 based on the determined alignment (e.g. crop rows 404) of the crops 120 in the field 150. In one embodiment, the flight path 406 is determined such that an offset angle is provided between a direction of the flight path 406 and an alignment of the crop rows 404. In some embodiments, the offset angle is non-zero. In other embodiments, the offset angle is about zero. In an example embodiment, the non-zero angle is in a range from about 45 degrees to about 90 degrees. In another example embodiment, the non-zero angle is in a range from about 0 degrees to about 90 degrees. This non-zero angle advantageously ensures minimal bias in collection of data from the altimeter 104 and/or SONAR sensor 106 over the flight path 406, 456. For purposes of simplicity, FIG. 4A merely depicts one pass of the flight path 406 over the field 150, however the determined flight path 406 features multiple passes over the field 150 where each pass is parallel to the depicted pass in FIG. 4A. In an example embodiment, the determined flight path 406 covers a minimum area (e.g. about 80%) of the area of the field 150. In an example embodiment, a perpendicular separation between adjacent passes is about 20 meters. In another example embodiment, the perpendicular separation is selected in a range from about 10 meters to about 30 meters.

In some embodiments, the processor 110 uploads the determined flight path 406 to the controller 108 of the UAV 102. In an embodiment, the UAV 102 is then flown over the field 150 in accordance with the flight path 406, where the UAV controller 108 ensures that the UAV 102 follows the flight path 406. In some embodiments, the flight path 406 includes a maximum elevation (e.g. 20 meters) that the UAV 102 does not exceed and the controller 108 ensures that the UAV does not exceed the maximum elevation over the flight path 406. In an example embodiment, the maximum elevation is based on manufacturer specifications of the SONAR sensor 106. This embodiment advantageously ensures that SONAR sensor 106 data is operational to capture data over the flight path 406. In this embodiment, the altimeter 104 and SONAR sensor 106 capture data at regular time increments along the flight path 406. The data is wirelessly transmitted to the processor 110 to determine the height 125 of the crops 120 at each time increment (e.g. using equations 1, 2 or 3).

Figure 4B:
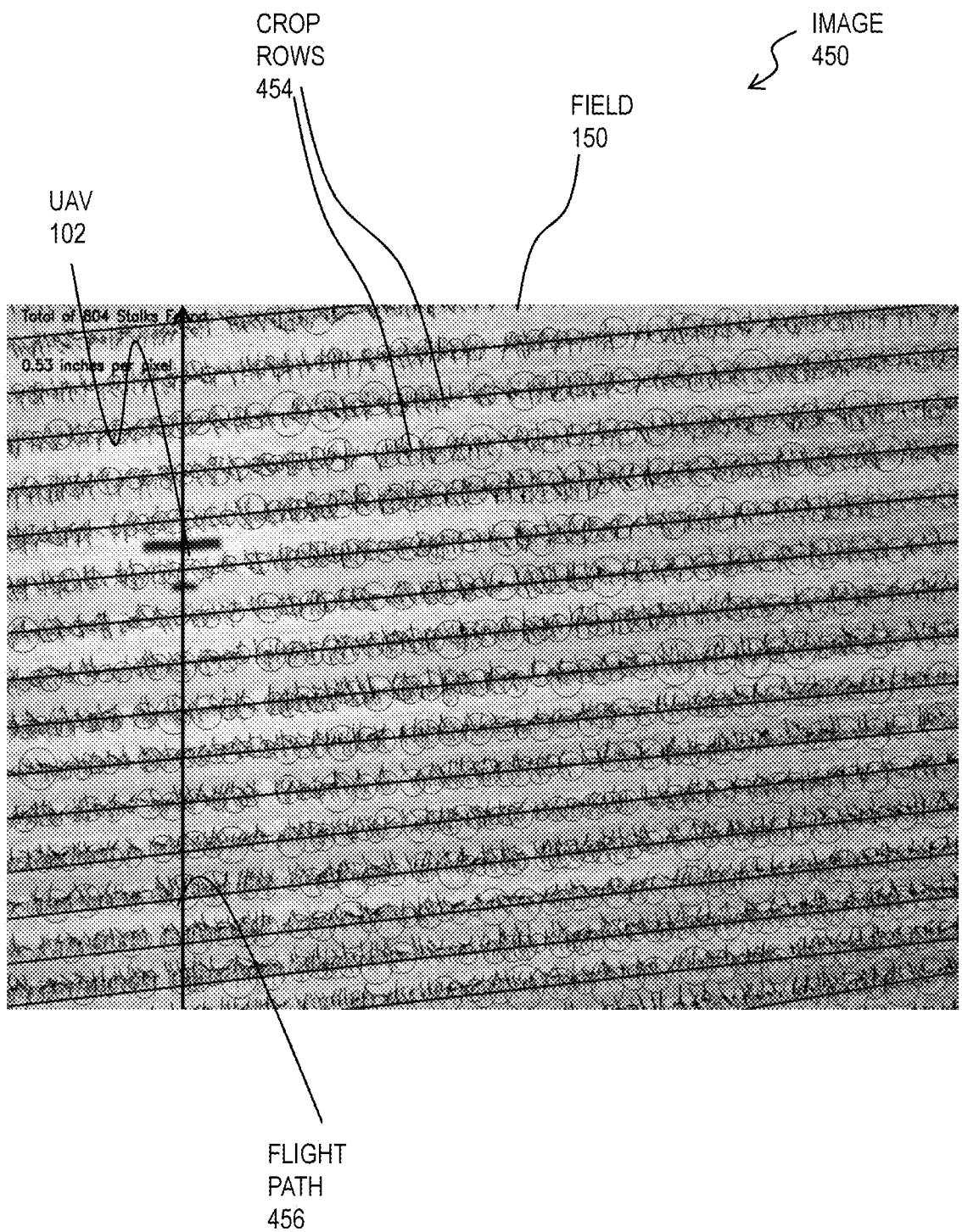
FIG. 4B is an image that illustrates an example of crop rows in a field and a flight path of a UAV over the field based on the crops rows, according to an embodiment.

FIG. 4B is an image 450 that illustrates an example of crop rows 454 in the field 150 and a flight path 456 of the UAV 102 over the field 150 based on the crops rows 454, according to an embodiment. The flight path 456 is determined by the processor 110 using the image 450, in a similar manner as the flight path 406 of FIG. 4A.

In some embodiments, the processor 110 determines one or more sections of the field 150 with a non-uniform density of crops 120, based on the image 400, 450. In one embodiment, the processor 110 determines that one or more sections of the field 150 has a high density of crops 120 (e.g. a density of crops 120 greater than a threshold density). In another embodiment, the processor 110 determines that one or more sections of the field 150 has a low density of crops 120 (e.g. a density of crops 120 lower than the same or different, smaller threshold density). In one embodiment, the high density of crops 120 is based on a measured density of crops 120 being greater than a high threshold density of a visible crop along a row 404. In an example embodiment, the high threshold density is a visible crop about every 6 inches along the row 404. In another example embodiment, the high threshold density is selected in a range from a visible crop about every 2 inches to about every 2 feet along the row 404. In another embodiment, the low density of crops 120 is based on a measured density of crops 120 being less than a low threshold density of a visible crop along a row 404. In an example embodiment, the low threshold density is a visible crop about every 2 feet along the row 404. In another example embodiment, the low threshold density is selected in a range from a visible crop about every 1 foot to about every 4 feet along the row 404. When determining the flight path 406, the processor 110 determines a rate of collecting of data from the altimeter 104 and/or the SONAR sensor 106 over these identified sections and includes this collection rate in the flight path 406 data. In one example embodiment, where the processor 110 determines that one or more sections of the field 150 has a high density of crops 120, the processor 110 increases the rate of collecting data from the altimeter 104 and/or the SONAR sensor 106 (e.g. reduces the time increment) when the UAV 102 is in these sections of the field 150. In another example embodiment, where the processor 110 determines that one or more sections of the field 150 has a low density of crops 120, the processor 110 reduces the rate of collecting data from the altimeter 104 and/or the SONAR sensor 106 (e.g. increases the time increment) when the UAV 102 is in these sections of the field 150.

In an embodiment, the processor 110 compares the determined height 125 of the crop 120 (e.g. using one of equations 1, 2 or 3) above the ground surface 122 at each location of the field 150 with a target height of the crop 120 above the ground surface 122. In an example embodiment, the processor 110 calculates a ratio of the determined height to the target height at each location and compares this ratio to 1. If the ratio is less than 1, the processor 110 determines that the crop 120 is underperforming relative to the target height and if the ratio is greater than 1, the processor 110 determines that the crop 120 is over performing relative to the target height.

In an embodiment, the target height of the crop is based on one or more of a type of the crop, a growth stage of the crop, a length of time since planting the crop and weather data at the ground surface. In an embodiment, the target height of the crop is a record with one or more fields corresponding to the crop type, growth stage, time since planting and weather data. In some embodiments, the target height record is stored in a memory (e.g. memory 604) of the processor 110 and is retrieved by the processor 110. In other embodiments, the target height record of the crop is stored in an external server (e.g. server 692) and retrieved by the processor 110 using a network link (e.g. network link 678).

In an embodiment, the target height is predicted by a model that receives one or more input parameters (e.g. type of crop, weather condition at ground surface since planting the crop, time since planting the crop, etc) and generates a prediction of the target height. In one embodiment, the model incorporates historical target height data based on historical measurements of actual crop height, crop type, time since planting and historical weather conditions. In this embodiment, the model predicts the target height, by comparing the inputted parameters with the field values of the historical target height data. In an example embodiment, the model is a linear effects model where fixed effects include the crop type and weather data such as temperature and precipitation since planting and random effects are location based. In one embodiment, such a model is discussed in "Crop Growth Modeling and Its Applications in Agricultural Meteorology", *Satellite Remote Sensing and GIS Applications in Agricultural Meteorology*, pp. 235-261, which is incorporated by reference in its entirety as if fully set forth herein, except for terminology that is inconsistent with that used herein.

In an embodiment, each target height record includes one or more fields that indicate one or more of the type of the crop, the growth stage of the crop, and current or cumulative weather data at the ground surface during growth of the crop. The processor 110 selects a target height record (e.g. from processor 110 memory or external server) to compare with the determined height by comparing values in one or more fields with one or more of the type of the crop 120, the growth stage of the crop 120, time since planting the crop 120 and current or cumulative weather data at the ground surface 122 during growth of the crop 120. In an example embodiment, where the crop 120 is corn, the growth stage is V7 and the weather data includes 20" of rain since planting, the processor 110 retrieves a target height record that has one or more fields corresponding to corn crop type, V7 growth stage and 20" of rain since planting. The processor 110 then compares this target height value (e.g. 0.5 m) with the determined height (e.g. 0.4 m), in order to determine whether the crop 120 is underperforming or over performing.

In an embodiment, the processor 110 receives data indicating a known height of the crops 120 above the ground surface 122. In some embodiments, the known height is input to the processor 110 using an input device 612 (e.g. keyboard, mouse, camera). In other embodiments, the known height is input to the processor 110 with an image that is received over an external network link 678. In one embodiment, the processor 110 compares the known height of the crop 120 above the ground surface 122 with the determined height 125 (e.g. using one of equations 1, 2 or 3). Based on this comparison, the processor 110 determines a biological sensitivity (e.g. mass density) of the crops 120. In an embodiment, the mass density of the crops 120 is a water density of the crops 120 or a water content of the crops 120 or a measure of a degree of moisture contained within the crops 120 and indicates an ability of the crops 120 to reflect a signal from the SONAR sensor 106 for measuring the SONAR distance 124. In an example embodiment, the processor 110 determines a low mass density of the crops 120, when the known height of the crops 120 (e.g. 6 feet) is exceeds the determined height 125 (e.g. 5 feet) by a threshold distance. In another example embodiment, the processor 110 determines a normal mass density of the crops 120, when the known height of the crops 120 is within a threshold distance of the determined height 125.

In an example embodiment, the UAV 102 is manufactured by DJI of Los Angeles, Calif., such as one of the Mavic®, Phantom®, Spark®, Inspire® and Matrice® series. Additionally, in an example embodiment, the UAV 102 is manufactured by Parrot of Paris, France. In a further example embodiment, the UAV 102 is manufactured by Precision-Hawk of Raleigh, N.C., such as the Lancaster® series.

3. Example Method

Figure 5B:
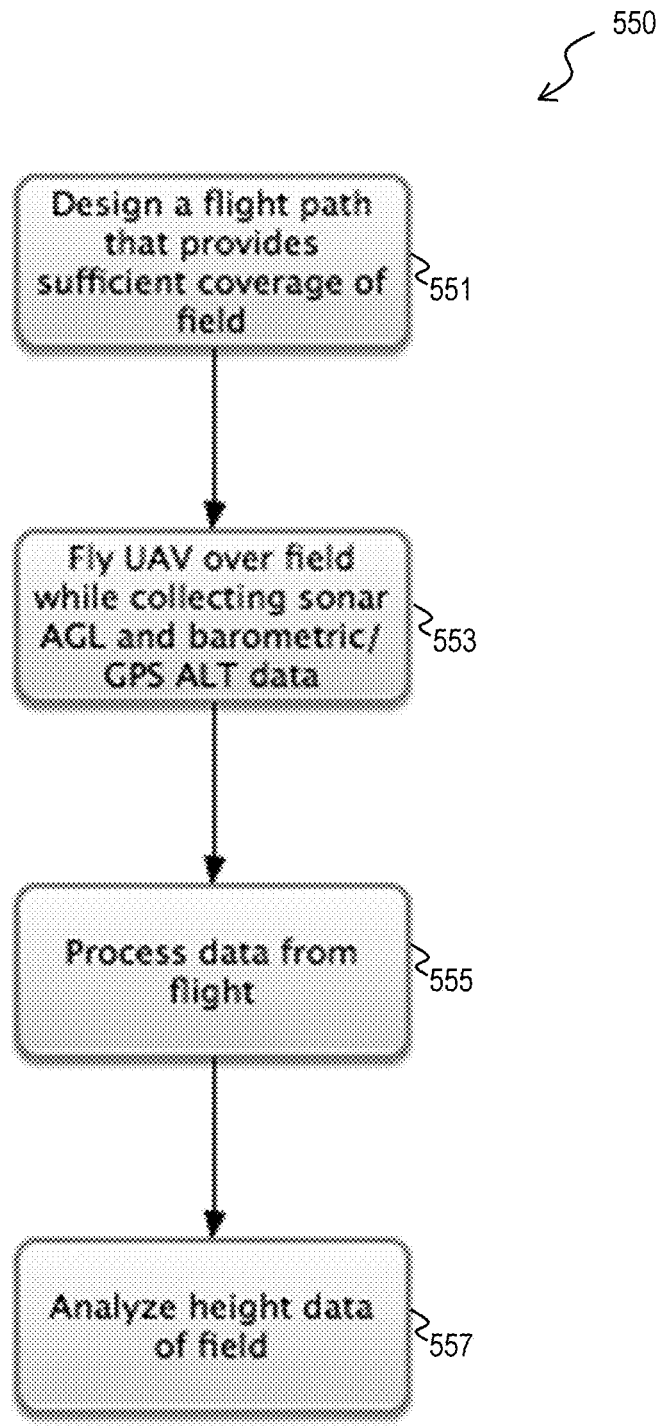
FIG. 5B is a flow chart that illustrates an example method for automatically determining a characteristic of a crop in a field or other properties of other objects on the ground surface, according to an embodiment.

FIG. 5A is a flow chart that illustrates an example method 500 for automatically determining a characteristic of an object (such as the crop) 120 in the field 150, according to an embodiment. Although steps are depicted in FIG. 5A, and in subsequent flowchart FIG. 5B, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 501, image data of the field 150 is received by the processor 110. In some embodiments, the image data is the image 400, 450. In other embodiments, image data is manually input by a user with the input device 612.

In step 503, an alignment of crops on the ground surface 122 of the field 150 is determined by the processor 110 based on the image data received in step 501. In some embodiments, the alignment is determined for the crop rows 404, 454.

In step 505, the flight path 406, 456 of the UAV 102 over the field 150 is determined by the processor 110 based on the alignment of the crops determined in step 503. In some embodiments, in step 505, the flight path 406, 456 is determined so that a non-zero angle is provided between the crop rows 404,454 and the flight path 406, 456 of the UAV 102 over the field 150. This non-zero angle advantageously ensures minimal bias in collection of data from the altimeter 104 and/or SONAR sensor 106 over the flight path 406, 456.

In some embodiments, the flight path is predetermined and steps 501 through 505 are omitted.

In step 507, the flight path 406, 456 is transmitted from the processor 110 to the UAV 102. In some embodiments, in step 507, the flight path 406, 456 is transmitted from the processor 110 to the controller 108 of the UAV 102.

In step 509, the UAV 102 is operated over the flight path 406, 456 at an elevation above the ground surface 122 of the field 150. In an embodiment, the controller 108 of the UAV 102 performs step 509. In some embodiments, in step 509 the elevation does not exceed a maximum elevation (e.g. 20 m) so that the SONAR sensor 106 remains operational. In an example embodiment, the maximum elevation is based on manufacturer specifications of the SONAR sensor 106. In one embodiment, the flight path 406, 456 data includes instructions regarding the maximum elevation which is enforced by the controller 108 during step 509.

In step 511, data is collected by the altimeter 104 over the flight path 406, 456 that indicates the elevation of the UAV 102 above the ground surface 122 at a plurality of locations. In some embodiments, the altimeter sensor is a barometric pressure altimeter. In an embodiment, the altimeter 104 data indicates elevation changes 128 of the UAV 102 at each location 140 relative to the initial elevation 126 at an initial location 140a. In an embodiment, the elevation of the UAV 102 at each location 140 is based on the elevation changes 128 at each location and the known initial elevation 126 at the initial location 140a.

In step 513, data is collected by the SONAR sensor 106 over the flight path 406, 456 that indicates the distance 124 to a nearest object 120 (e.g. top of crop) on the ground surface 122 at a plurality of locations. In an embodiment, the data is collected in steps 511, 513 based on a time increment. In some embodiments, the time increment is fixed for each location above the ground surface 122. In other embodiments, the time increment is adjusted based on the location above the ground surface 122.

In step 515, data is collected by the wind sensor 112 that indicates the wind speed at the ground surface 122.

In step 517, the data collected in steps 511, 513 and 515 is transmitted to the processor 110. In one embodiment, the data collected by the altimeter 104 and SONAR sensor 106 from steps 511 and 513 is collected by the controller 108 of the UAV 102 and transmitted from the controller 108 to the processor 110. In one embodiment, the processor 110 is located at a ground station and is in wireless communication with the wind sensor 112 and the UAV 102. In some embodiments, step 517 is performed in real time as the UAV 102 flies over the field 150 based on the flight path 406, 456. In other embodiments, step 517 is performed after the UAV 102 has finished flying over the field 150 based on the flight path 406, 456.

In step 519, the height 125 of the object (e.g. crop) 120 above the ground surface 122 at each location 140 is determined by the processor 110. In an embodiment, the processor 110 performs step 519 using the data received in step 517 (e.g. using one of equations 1, 2 or 3). In another embodiment, in step 519 the processor 110 uses the ground level correction data to determine the height 125 in step 519 (e.g. using equation 2) and averages measurements from several different time increments in the vicinity of a particular ground location.

In step 521, the determined height 125 from step 519 is compared with a target height by the processor 110. In an embodiment, in step 521, the processor 110 computes a ratio of the determined height 125 to the target height. If the ratio is less than one, the processor 110 determines that the object (e.g. crop) 120 is underperforming. If the ratio is greater than one, the processor 110 determines that the object (e.g. crop) 120 is over performing. In one embodiment, the target height is stored in a record that has one or more fields including crop type, crop growth stage, amount of time since planting the crop and weather conditions. In an embodiment, in step 521, one or more characteristics of the object 120 (e.g. crop type, crop growth stage, amount of time since planting, weather conditions) is compared with values of the fields of each target height record, to select a target height record to be used in the comparison step 521.

In step 523, a device is operated based on the determined property of the object, e.g., based on the height 125 of the crop determined in step 519. In some embodiments, the device is a computer monitor or printer which is operated to display values of one or more properties at one or more locations in the field. In one embodiment, in step 523, farming equipment is operated based on the comparison in step 521. In an example embodiment, in step 523, farming equipment is used to harvest the crops 120 based on the comparison in step 521 of the determined height 125 with a target height corresponding to a crop at a harvest growth stage. In another embodiment, in step 523, equipment is operated to water the crops based on a comparison in step 521 of the determined height 125 that is under performing relative to a target height of the same crop type after a same amount of time since planting the crop.

FIG. 5B is a flow chart that illustrates an example method 550 for automatically determining a characteristic of the object (e.g. crop) 120 in the field 150, according to an embodiment. In step 551, the flight path 406, 456 is designed that provides sufficient coverage of the field 150. In an example embodiment, step 551 involves steps 501, 503, 505, 507 of method 500.

In step 553, the UAV 102 is flown over the field 150 while data is collected from the altimeter 104 and SONAR sensor 106. In an example embodiment, step 553 involves steps 509, 511, 513 of method 500.

In step 555, the collected data from the flight in step 553 is processed by the processor 110. In an example embodiment, step 555 involves step 519 of method 500.

In step 557, the processed data from the processor 110 in step 555 is analyzed. In an example embodiment, step 557 involves step 521 of method 500.

4. Computational Hardware Overview

FIG. 6 is a block diagram that illustrates a computer system 600 upon which an embodiment of the invention may be implemented. Computer system 600 includes a communication mechanism such as a bus 610 for passing information between other internal and external components of the computer system 600. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit).). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of one or more methods described herein.

A sequence of binary digits constitutes digital data that is used to represent a number or code for a character. A bus 610 includes many parallel conductors of information so that information is transferred quickly among devices coupled to the bus 610. One or more processors 602 for processing information are coupled with the bus 610. A processor 602 performs a set of operations on information. The set of operations include bringing information in from the bus 610 and placing information on the bus 610. The set of operations also typically include comparing two or more units of information, shifting positions of units of information, and combining two or more units of information, such as by addition or multiplication. A sequence of operations to be executed by the processor 602 constitutes computer instructions.

Computer system 600 also includes a memory 604 coupled to bus 610. The memory 604, such as a random access memory (RAM) or other dynamic storage device, stores information including computer instructions. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of computer instructions. The computer system 600 also includes a read only memory (ROM) 606 or other static storage device coupled to the bus 610 for storing static information, including instructions, that is not changed by the computer system 600. Also coupled to bus 610 is a non-volatile (persistent) storage device 608, such as a magnetic disk or optical disk, for storing information, including instructions, that persists even when the computer system 600 is turned off or otherwise loses power.

Information, including instructions, is provided to the bus 610 for use by the processor from an external input device 612, such as a keyboard containing alphanumeric keys operated by a human user, or a sensor. A sensor detects conditions in its vicinity and transforms those detections into signals compatible with the signals used to represent information in computer system 600. Other external devices coupled to bus 610, used primarily for interacting with humans, include a display device 614, such as a cathode ray tube (CRT) or a liquid crystal display (LCD), for presenting images, and a pointing device 616, such as a mouse or a trackball or cursor direction keys, for controlling a position of a small cursor image presented on the display 614 and issuing commands associated with graphical elements presented on the display 614.

In the illustrated embodiment, special purpose hardware, such as an application specific integrated circuit (IC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 670 sends and receives electrical, acoustic or electromagnetic signals, including infrared and optical signals, that carry information streams, such as digital data.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 602, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 602, except for carrier waves and other signals.

Logic encoded in one or more tangible media includes one or both of processor instructions on a computer-readable storage media and special purpose hardware, such as ASIC 620.

Network link 678 typically provides information communication through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server 692 connected to the Internet provides a service in response to information received over the Internet. For example, server 692 provides information representing video data for presentation at display 614.

The invention is related to the use of computer system 600 for implementing the techniques described herein. According to one embodiment of the invention, those techniques are performed by computer system 600 in response to processor 602 executing one or more sequences of one or more instructions contained in memory 604. Such instructions, also called software and program code, may be read into memory 604 from another computer-readable medium such as storage device 608. Execution of the sequences of instructions contained in memory 604 causes processor 602 to perform the method steps described herein. In alternative embodiments, hardware, such as application specific integrated circuit 620, may be used in place of or in combination with software to implement the invention. Thus, embodiments of the invention are not limited to any specific combination of hardware and software.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server 692 transmits program code for a particular application, requested by a message sent from computer 600, through Internet 690, ISP equipment 684, local network 680 and communications interface 670. The received code may be executed by processor 602 as it is received, or may be stored in storage device 608 or other non-volatile storage for later execution, or both. In this manner, computer system 600 may obtain application program code in the form of a signal on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red a carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set 700 upon which an embodiment of the invention may be implemented. Chip set 700 is programmed to perform one or more steps of a method described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 700, or a portion thereof, constitutes a means for performing one or more steps of a method described herein.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 705 also stores the data associated with or generated by the execution of one or more steps of the methods described herein.

FIG. 8 is a diagram of exemplary components of a mobile terminal 800 (e.g., cell phone handset) for communications, which is capable of operating in the system of FIG. 1A, according to one embodiment. In some embodiments, mobile terminal 801, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps as described herein. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 as described herein. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

In some embodiments, the mobile terminal 801 includes a digital camera comprising an array of optical detectors, such as charge coupled device (CCD) array 865. The output of the array is image data that is transferred to the MCU for further processing or storage in the memory 851 or both. In the illustrated embodiment, the light impinges on the optical array through a lens 863, such as a pin-hole lens or a material lens made of an optical grade glass or plastic material. In the illustrated embodiment, the mobile terminal 801 includes a light source 861, such as a LED to illuminate a subject for capture by the optical array, e.g., CCD 865. The light source is powered by the battery interface and power control module 820 and controlled by the MCU 803 based on instructions stored or loaded into the MCU 803.

5. Alternatives, Extensions and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

6. References Cited

"Crop Growth Modeling and Its Applications in Agricultural Meteorology", *Satellite Remote Sensing and GIS Applications in Agricultural Meteorology*, pp. 235-261.

What is claimed is:

1. A method comprising:
   operating an unmanned aerial vehicle (UAV) at an elevation above a ground surface of a field;
   collecting, with a barometric pressure based altimeter of the UAV, first data that indicates an elevation of the UAV above the ground surface;
   collecting, with a SONAR sensor of the UAV, second data that indicates a distance from the UAV to a nearest object on the ground surface;
   collecting, with a wind sensor, third data that indicates a wind speed at the ground surface;
   receiving, on a processor, the first data, the second data and the third data;
   determining, on the processor, a height of the nearest object above the ground surface based on the first data, the second data and the third data; and
   presenting on a display device output data that indicates the height of the nearest object,
   wherein the SONAR sensor has a SONAR sensor range and the elevation above the ground surface is less than the SONAR sensor range.

2. A method as recited in claim 1, wherein the determining the height of the nearest object above the ground surface is based on a difference between the elevation and the distance to the nearest object.

3. A method as recited in claim 1,
   wherein the collecting the first data is performed at a first plurality of time increments as the UAV is operated to translate above the ground to indicate the elevation above a second plurality of locations of the ground surface;
   wherein the collecting the second data is performed at the first plurality of time increments;
   wherein the height of the nearest object above the second plurality of locations of the ground surface is determined based on the first data and the second data at the first plurality of time increments.

4. A method as recited in claim 3, wherein the determining the height of the nearest object above each location of the second plurality of locations of the ground surface is based on an average of a third plurality of heights of the nearest object at a subset of the first plurality of time increments.

5. A method as recited in claim 1, further comprising:
   receiving, on the processor, field data indicating one or more characteristics of the field;
   determining, on the processor, object data regarding objects on the ground surface of the field based on the field data; and
   determining, on the processor, a flight path of the UAV over the field based on the object data.

6. A method as recited in claim 5,
   wherein the field data is image data of the field;
   wherein the objects are crops and the object data comprises an alignment of the crops over the ground surface of the field; and
   wherein the flight path is determined based on an offset angle between the flight path and the alignment of the crops, wherein the offset angle is greater than zero degrees.

7. A method as recited in claim 5, further comprising uploading the flight path to a controller of the UAV;
   wherein the operating the UAV comprises flying the UAV along the flight path;
   wherein the collecting the first data comprises collecting the first data along the flight path; and
   wherein the collecting the second data comprises collecting the second data along the flight path.

8. A method as recited in claim 5, wherein the determining the flight path ensures that a minimum percentage of the field is covered by the flight path.

9. A method as recited in claim 8, wherein the minimum percentage is about 80%.

10. A method as recited in claim 5, wherein the determining the flight path of the UAV further comprises:
    determining, with the processor, one or more sections of the field with a non-uniform density of objects based on the object data;
    determining, with the processor, a first rate for the collecting the first data over the one or more sections, said first rate based on the non-uniform density; and
    determining, with the processor, a second rate for the collecting the second data over the one or more sections, said second rate based on the non-uniform density.

11. A method as recited in claim 1, wherein the operating the UAV is performed such that the elevation is about 20 meters.

12. A method as recited in claim 1, wherein the object is a crop and wherein the method further comprises:
    comparing, on the processor, the height of the crop above the ground surface with a target height of a target crop above the ground surface;

wherein the target height is based on at least one of a type of the target crop, a growth stage of the target crop, and historical weather data at the ground surface during growth of the target crop.

13. A method as recited in claim 12, wherein the comparing step further comprises comparing at least one of a type of the crop with the type of the target crop, a growth stage of the crop with the growth stage of the target crop, and weather data at the ground surface during growth of the crop with the historical weather data.

14. A method as recited in claim 1, further comprising:
receiving, on the processor, a known height of the nearest object above the ground surface;
comparing, on the processor, the determined height of the nearest object above the ground surface with the known height of the nearest object above the ground surface; and
determining, on the processor, a density of the nearest object above the ground surface based on the comparing step.

15. A method as recited in claim 1, wherein the sonar sensor and barometric pressure based altimeter are standard equipment on the UAV.

16. A method comprising:
operating an unmanned aerial vehicle (UAV) at an elevation above a ground surface of a field;
collecting, with a barometric pressure based altimeter of the UAV, first data that indicates an elevation of the UAV above the ground surface;
collecting, with a SONAR sensor of the UAV, second data that indicates a distance from the UAV to a nearest object on the ground surface;
receiving, on a processor, the first data and the second data;
determining, on the processor, a height of the nearest object above the ground surface based on the first data and the second data; and
presenting on a display device output data that indicates the height of the nearest object,
wherein the SONAR sensor has a SONAR sensor range and the elevation above the ground surface is less than the SONAR sensor range; and
wherein the determining the height of the nearest object is further based on ground level correction data that indicates a difference in an elevation of the ground surface at the nearest object from the elevation of the ground surface where the collecting of the first data is initiated.

17. A method as recited in claim 16, wherein the ground level correction data is topographic height data stored on a geospatial database and wherein the method further includes receiving, on the processor, the topographic height data from the geospatial database.

18. A method as recited in claim 16, wherein the object is a crop and wherein the ground level correction data is survey data obtained by performing a survey of the field before the crop emerges from the ground.

19. A non-transitory computer-readable medium carrying one or more sequences of instructions, wherein execution of the one or more sequences of instructions by one or more processors causes the one or more processors to perform the steps of:
receiving first data from a barometric pressure based altimeter of an unmanned aerial vehicle (UAV) that indicates an elevation of the UAV above a ground surface of a field;
receiving second data from a SONAR sensor of the UAV that indicates a distance from the UAV to a nearest object on the ground surface;
receiving third data from a wind sensor that indicates a wind speed at the ground surface;
determining a height of the nearest object above the ground surface based on the first data, the second data and the third data; and presenting on a display device output data that indicates the height of the nearest object,
wherein the SONAR sensor has a SONAR sensor range and the elevation above the ground surface is less than the SONAR sensor range.

20. An apparatus comprising:
at least one processor; and
at least one memory including one or more sequences of instructions,
the at least one memory and the one or more sequences of instructions configured to, with the at least one processor, cause the apparatus to perform at least the following:
receive first data from a barometric pressure based altimeter of an unmanned aerial vehicle (UAV) that indicates an elevation of the UAV above a ground surface of a field;
receive second data from a SONAR sensor of the UAV that indicates a distance from the UAV to a nearest object on the ground surface;
receive third data from a wind sensor that indicates a wind speed at the ground surface;
determine a height of the nearest object above the ground surface based on the first data, the second data and the third data; and
present on a display device output data that indicates the height of the nearest object,
wherein the SONAR sensor has a SONAR sensor range and the elevation above the ground surface is less than the SONAR sensor range.

21. A system comprising:
an unmanned aerial vehicle (UAV) comprising:
a barometric pressure based altimeter configured to measure first data that indicates an elevation of the UAV above a ground surface, and
a SONAR sensor configured to measure second data that indicates a distance from the UAV to a nearest object on the ground surface,
a wind sensor configured to measure third data that indicates a wind speed at the ground surface;
at least one processor; and at least one memory including one or more sequences of instructions,
the at least one memory and the one or more sequences of instructions configured to, with the at least one processor, cause the system to perform at least the following:
receive the first data and the second data from the UAV;
determine a height of the nearest object above the ground surface based on the first data, the second data and the third data; and
present on a display device output data that indicates the height of the nearest object,
wherein the SONAR sensor has a SONAR sensor range and the elevation above the ground surface is less than the SONAR sensor range.

22. A non-transitory computer-readable medium carrying one or more sequences of instructions, wherein execution of the one or more sequences of instructions by one or more processors causes the one or more processors to perform the steps of:

receiving first data from a barometric pressure based altimeter of an unmanned aerial vehicle (UAV) that indicates an elevation of the UAV above a ground surface of a field;

receiving second data from a SONAR sensor of the UAV that indicates a distance from the UAV to a nearest object on the ground surface;

determining a height of the nearest object above the ground surface based on the first data and the second data; and presenting on a display device output data that indicates the height of the nearest object, wherein the SONAR sensor has a SONAR sensor range and the elevation above the ground surface is less than the SONAR sensor range;

wherein the determining the height of the nearest object is further based on ground level correction data that indicates a difference in an elevation of the ground surface at the nearest object from the elevation of the ground surface where the collecting of the first data is initiated;

wherein the UAV is configured to be operated above the ground surface of the field;

wherein the barometric pressure based altimeter of the UAV is configured to collect the first data; and wherein the SONAR sensor of the UAV is configured to collect the second data.

23. An apparatus comprising:

at least one processor; and at least one memory including one or more sequences of instructions, the at least one memory and the one or more sequences of instructions configured to, with the at least one processor, cause the apparatus to perform at least the following:

receive first data from a barometric pressure based altimeter of an unmanned aerial vehicle (UAV) that indicates an elevation of the UAV above a ground surface of a field;

receive second data from a SONAR sensor of the UAV that indicates a distance from the UAV to a nearest object on the ground surface;

determine a height of the nearest object above the ground surface based on the first data and the second data; and present on a display device output data that indicates the height of the nearest object, wherein the SONAR sensor has a SONAR sensor range and the elevation above the ground surface is less than the SONAR sensor range;

wherein the determination of the height of the nearest object is further based on ground level correction data that indicates a difference in an elevation of the ground surface at the nearest object from the elevation of the ground surface where collection of the first data is initiated;

wherein the UAV is configured to be operated above the ground surface of the field;

wherein the barometric pressure based altimeter of the UAV is configured to collect the first data; and wherein the SONAR sensor of the UAV is configured to collect the second data.

24. A system comprising:

an unmanned aerial vehicle (UAV) comprising:

a barometric pressure based altimeter configured to measure first data that indicates an elevation of the UAV above a ground surface, and a SONAR sensor configured to measure second data that indicates a distance from the UAV to a nearest object on the ground surface, at least one processor; and at least one memory including one or more sequences of instructions, the at least one memory and the one or more sequences of instructions configured to, with the at least one processor, cause the system to perform at least the following:

receive the first data and the second data from the UAV;

determine a height of the nearest object above the ground surface based on the first data and the second data; and present on a display device output data that indicates the height of the nearest object, wherein the SONAR sensor has a SONAR sensor range and the elevation above the ground surface is less than the SONAR sensor range;

wherein the determination of the height of the nearest object is further based on ground level correction data that indicates a difference in an elevation of the ground surface at the nearest object from the elevation of the ground surface where collection of the first data is initiated;

wherein the UAV is configured to be operated above the ground surface of the field;

wherein the barometric pressure based altimeter of the UAV is configured to collect the first data; and wherein the SONAR sensor of the UAV is configured to collect the second data.

* * * * *